US010591529B2

(12) United States Patent
Toyama et al.

(10) Patent No.: US 10,591,529 B2
(45) Date of Patent: Mar. 17, 2020

(54) WIRING SAFETY EVALUATION SYSTEM AND WIRING SAFETY EVALUATION METHOD

(71) Applicant: MITSUBISHI AIRCRAFT CORPORATION, Aichi (JP)

(72) Inventors: Koji Toyama, Tokyo (JP); Susumu Hirabayashi, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 179 days.

(21) Appl. No.: 15/384,649

(22) Filed: Dec. 20, 2016

(65) Prior Publication Data
US 2017/0184654 A1 Jun. 29, 2017

(30) Foreign Application Priority Data

Dec. 25, 2015 (JP) ................. 2015-253910

(51) Int. Cl.
*G01R 31/04* (2006.01)
*G06F 17/50* (2006.01)
(Continued)

(52) U.S. Cl.
CPC ......... *G01R 31/045* (2013.01); *G01R 31/021* (2013.01); *G05B 23/0248* (2013.01);
(Continued)

(58) Field of Classification Search
CPC ... G01R 31/045; G01R 31/021; G06F 17/509; G06F 17/5095; G06F 2217/36;
(Continued)

(56) References Cited

U.S. PATENT DOCUMENTS

2007/0050178 A1* 3/2007 Linzey ................. G06Q 10/04
703/2
2009/0265119 A1 10/2009 Bhattacharya et al.
(Continued)

FOREIGN PATENT DOCUMENTS

JP 5182973 A 4/2013
JP 2014061841 A 4/2014
JP 2014194676 A 10/2014

OTHER PUBLICATIONS

Papadopoulos, Y. et al., "Engineering failure analysis and design optimisation with HiP-HOPS", Engineering Failure Analysis, vol. 18, pp. 590-608, (2011).
(Continued)

Primary Examiner — Yoshihisa Ishizuka
(74) Attorney, Agent, or Firm — Pearne & Gordon LLP

(57) ABSTRACT

A wiring safety evaluation system that makes it possible to easily determine whether a plurality of electrical wires secured in redundancy belong to the same harness to evaluate wiring safety is provided. The wiring safety evaluation system according to the present invention includes a processing section that identifies, after an event ID is specified, whether a gate type of a parent ID corresponding to the event ID is an OR gate or an AND gate, and when the gate type is the OR gate, repeats a process procedure of identifying whether a gate type of a parent ID that is a parent in next generation of the parent ID is an OR gate or an AND gate to determine whether the specified event causes a top event.

17 Claims, 11 Drawing Sheets

(51) Int. Cl.
    *G05B 23/02*       (2006.01)
    *G01R 31/02*       (2006.01)
    *B60R 16/02*       (2006.01)

(52) U.S. Cl.
    CPC ........ *G06F 17/509* (2013.01); *B60R 16/0207* (2013.01); *G05B 2219/24085* (2013.01); *G06F 17/5095* (2013.01); *G06F 2217/36* (2013.01)

(58) Field of Classification Search
    CPC ...... G05B 23/0248; G05B 2219/24085; B60R 16/0207
    See application file for complete search history.

(56) References Cited

U.S. PATENT DOCUMENTS

| | | | |
|---|---|---|---|
| 2014/0088919 A1* | 3/2014 | Toyama | ................ G06F 17/509 702/181 |
| 2014/0218046 A1 | 8/2014 | Nakayama et al. | |
| 2014/0297207 A1 | 10/2014 | Toyama et al. | |
| 2015/0019187 A1* | 1/2015 | Jones | .................. G06F 17/5009 703/8 |

OTHER PUBLICATIONS

Extended European Search Report issued in Patent Application No. EP 16 20 4460 dated Apr. 19, 2017.

\* cited by examiner

FIG. 5A

| CONNECTOR ID | PIN-ID | FAILURE MODE | | Failure Effects |
|---|---|---|---|---|
| | | SHORT-CIRCUIT FAILURE | DISCONNECTION FAILURE | |
| C1 | P11 | | ✓ | EVENT W10 OCCURS |
| | P12 | ✓ | | EVENT W10 OCCURS |
| | P13 | ✓ | | EVENT W11 OCCURS |
| | P14 | ✓ | ✓ | EVENT W14 OCCURS |
| | P15 | ✓ | | EVENT W15 OCCURS |
| | P16 | ✓ | ✓ | EVENT W16 OCCURS |

FIG. 5B

| CONNECTOR ID | PIN-ID | FAILURE MODE | | Failure Effects |
|---|---|---|---|---|
| | | SHORT-CIRCUIT FAILURE | DISCONNECTION FAILURE | |
| C2 | P21 | ✓ | ✓ | EVENT W21 OCCURS |
| | P22 | ✓ | ✓ | EVENT W22 OCCURS |
| | P23 | ✓ | | EVENT W12 OCCURS |
| | P24 | ✓ | | EVENT W24 OCCURS |
| | P25 | ✓ | | EVENT W25 OCCURS |
| | P26 | ✓ | ✓ | EVENT W26 OCCURS |

FIG. 6

| PARENT ID | EVENT ID | GATE TYPE | ... |
|---|---|---|---|
| CCD | AAA | OR Gate | ... |
| AAA | AAB | Basic Event | ... |
| AAA | ABA | AND Gate | ... |
| ABA | BBB | Basic Event | ... |
| ABA | BAB | Basic Event | ... |
| AAA | BBA | OR Gate | ... |
| AAA | ABB | Basic Event | ... |
| BBA | AAC | Basic Event | ... |
| BBA | W12 | Basic Event | ... |
|  | CCC | OR Gate | ... |
| CCC | CCD | AND Gate | ... |
| CCD | CDC | OR Gate | ... |
| CDC | DCC | Basic Event | ... |
| CDC | EEE | OR Gate | ... |
| CDC | EEF | Basic Event | ... |
| CDC | FFE | Basic Event | ... |
| CDC | GGG | Basic Event | ... |
| EEE | DDD | Basic Event | ... |
| EEE | DCD | Basic Event | ... |
| EEE | ACC | Basic Event | ... |
| EEE | W11 | Basic Event | ... |
| EEE | FFF | Basic Event | ... |
| CCC | HGG | Basic Event | ... |
| CCD | AAA | OR Gate | ... |
| ⋮ | ⋮ | ⋮ | ⋮ |

FIG. 7

HARNESS ID:WH1

| No. | WIRE ID | ITEM-1 | | ITEM-2 | |
|---|---|---|---|---|---|
| | | CONNECTOR ID | PIN-ID | CONNECTOR ID | PIN-ID |
| 1 | W 101 | C1 | P11 | C2 | P21 |
| 2 | W 102 | C1 | P12 | C2 | P22 |
| 3 | W 103 | C1 | P13 | C3 | P31 |
| 4 | W 104 | C1 | P14 | C3 | P32 |
| 5 | W 105 | C1 | P15 | C4 | P41 |
| 6 | W 106 | C1 | P16 | C4 | P42 |
| 7 | W 107 | C2 | P23 | C3 | P33 |
| 8 | W 108 | C2 | P24 | C3 | P34 |
| 9 | W 109 | C2 | P25 | C4 | P43 |
| 10 | W 110 | C2 | P26 | C4 | P44 |
| 11 | W 111 | C3 | P35 | C4 | P45 |
| 12 | W 112 | C3 | P36 | C4 | P46 |

HARNESS ID:WH2

| No. | WIRE ID | ITEM-1 | | ITEM-2 | |
|---|---|---|---|---|---|
| | | CONNECTOR ID | PIN-ID | CONNECTOR ID | PIN-ID |
| 1 | W 201 | C5 | P51 | C6 | P61 |
| 2 | W 202 | C5 | P52 | C6 | P62 |
| 3 | W 203 | C5 | P53 | C7 | P71 |
| 4 | W 204 | C5 | P54 | C7 | P72 |
| 5 | W 205 | C5 | P55 | C8 | P81 |
| 6 | W 206 | C5 | P56 | C8 | P82 |
| 7 | W 207 | C6 | P63 | C7 | P73 |
| 8 | W 208 | C6 | P64 | C7 | P74 |
| 9 | W 209 | C6 | P65 | C8 | P83 |
| 10 | W 210 | C6 | P66 | C8 | P84 |
| 11 | W 211 | C7 | P75 | C8 | P85 |
| 12 | W 212 | C7 | P76 | C8 | P86 |

FIG. 8

| ITEM-1 | | ITEM-2 | |
|---|---|---|---|
| CONNECTOR ID | PIN ID | CONNECTOR ID | PIN ID |
| C3 | P31 | C5 | P55 |
| | P32 | | P56 |
| | P33 | | P53 |
| | P34 | | P54 |
| | P35 | | P51 |
| | P36 | | P52 |
| C4 | P41 | C6 | P61 |
| | P42 | | P62 |
| | P43 | | P63 |
| | P44 | | P64 |
| | P45 | | P65 |
| | P46 | | P66 |

FIG. 9

| Bundle Section | ITEM-1 | ITEM-2 |
|---|---|---|
| B1 | C1 | A1 |
| B2 | C2 | A1 |
| B3 | A1 | A2 |
| B4 | A2 | C3 |
| B5 | A2 | C4 |
| B6 | C5 | A3 |
| B7 | C6 | A4 |
| B8 | A3 | A4 |
| B9 | A3 | C7 |
| B10 | A4 | C8 |

FIG. 10

| No. | BUNDLE ID | ITEM-1 | ITEM-2 | WIRE ID | | | | | | | |
|---|---|---|---|---|---|---|---|---|---|---|---|
| 1 | B1 | G1 | A1 | W101 | W102 | W103 | W104 | W105 | W106 | | |
| 2 | B2 | C2 | A1 | W101 | W102 | W107 | W108 | W109 | W110 | | W110 |
| 3 | B3 | A1 | A2 | W103 | W104 | W105 | W106 | W107 | W108 | W109 | |
| 4 | B4 | A2 | C3 | W103 | W104 | W107 | W108 | W111 | W112 | | |
| 5 | B5 | A2 | C4 | W105 | W106 | W109 | W110 | W111 | W112 | | |
| 6 | B6 | C5 | A3 | W201 | W202 | W203 | W204 | W205 | W206 | | |
| 7 | B7 | C6 | A4 | W201 | W202 | W207 | W208 | W209 | W210 | | |
| 8 | B8 | A3 | A4 | W205 | W206 | W207 | W208 | | | | |
| 9 | B9 | A3 | C7 | W203 | W204 | W207 | W208 | W211 | W212 | | |
| 10 | B10 | A4 | C8 | W205 | W206 | W209 | W210 | W211 | W212 | | |

FIG. 11

SAFETY ANALYSIS RESULT

OBJECT HARNESS ID: WH1　　ANALYSIS DATE : 2015. 10. 19

SAFETY OF THE FOLLOWING BUNDLES AND CONNECTORS HAVE BEEN VERIFIED.

B1, B2, B5,
C1, C2, C4

SAFETY OF THE FOLLOWING BUNDLES AND CONNECTORS HAVE BEEN DENIED. DESIGN CHANGE IS NECESSARY.

B3, B4,
C3

(RETURN)

SAFETY ANALYSIS RESULT

OBJECT HARNESS ID: WH2　　ANALYSIS DATE : 2015. 10. 19

SAFETY OF THE FOLLOWING BUNDLES AND CONNECTORS HAVE BEEN VERIFIED.

B7, B8, B9, B10,
C6, C7, C8

SAFETY OF THE FOLLOWING BUNDLES AND CONNECTORS HAVE BEEN DENIED. DESIGN CHANGE IS NECESSARY.

B6,
C5

(RETURN)

WIRING SAFETY EVALUATION SYSTEM AND WIRING SAFETY EVALUATION METHOD

BACKGROUND OF THE INVENTION

Field of the Invention

The present invention relates to a system of evaluating safety of wiring that connects a plurality of electronic apparatuses to one another through electrical wires and connectors.

Description of the Related Art

For example, in a wiring system that is configured of an input device, a control device, and an output device that are connected with one another through a wire harness (hereinafter, also simply referred to as harness), it is necessary to verify redundancy, whether electrical wires configuring the harness are connected with an appropriate route, after the system is constructed. For example, when a part of the harness in which a plurality of electrical wires are bundled is disconnected, in order to prevent an event of a device failure caused by disconnection of two electrical wires included in the bundle, it is necessary to bundle and wire the two electrical wires in different harnesses from each other (i.e., the two electrical wires are not included in the same bundle) and to fit out the plurality of harnesses with a route that physically separates the harnesses from one another. In a case of a system that has a large number of harnesses (the number of wirings) and a large number of terminal devices such as an input device or relay devices, however, it is not easy to check validity of a connection route from a plurality of wiring diagrams and to verify wiring safety.

Therefore, the present applicant has proposed, in Japanese Patent No. 5182973, a wiring connection confirmation system that makes it possible to easily confirm a connection route by a single electrical wire unit even in a large-scale system. Also, the present applicant has proposed, in Japanese Patent Laid-Open No. 2014-61841, a system that easily extracts harnesses having a one bundle risk and harnesses having a risk of safety impairing in simultaneous failure, and has further proposed, in Japanese Patent Laid-Open No. 2014-194676, a system that makes it possible to qualitatively analyze wiring safety of a complicated wiring structure.

Fault tree analysis (FTA) is widely known as a safety evaluation method. In a use requiring high safety, for example, in an aircraft, an electronic apparatus, a terminal device, and an electrical wire each have redundancy; however, the redundancy makes it difficult to verify safety.

In other words, in a large-scale system in which a plurality of sub-systems are integrated such as a control system for an aircraft, several tens or several hundreds of fault trees are analysis objects, and the plurality of fault trees configure a nest structure. In contrast, a plurality of terminal devices configuring the large-scale system and wirings that connects the terminal devices with one another are configured of thousands or tens of thousands of electrical wires. Therefore, although it is possible to determine whether the plurality of specific electrical wires belong to the same harness by the technology proposed by Japanese Patent Laid-Open No. 2014-61841, it is not easy to evaluate wiring safety through specification of electrical wires in redundant relationship and determination that the electrical wires are separately and independently from one another.

Accordingly, an object of the present invention is to provide a system that makes it possible to easily evaluate wiring safety.

SUMMARY OF THE INVENTION

The present invention provides a wiring safety evaluation system in a wiring structure in which a plurality of electrical wires belonging to a wire harness are each connected, through relay elements, to a pair of connectors located at respective ends of the wire harness.

The wiring safety evaluation system according to the present invention includes a memory section configured to hold fault tree information in which event IDs serving as identification information of respective events, gate types indicating respective kinds of gates corresponding to the respective event IDs, parent IDs serving as identification information of respective events corresponding to parents of the respective event IDs, and identification information indicating that one of the event IDs is a top event are associated with one another in the wiring structure.

Also, the safety evaluation system according to the present invention includes a processing section that identifies, after an event ID relating to the electrical wire is selected from the event IDs, whether the gate type of the parent ID corresponding to the selected event ID is an OR gate or an AND gate, and when the gate type is the OR gate, repeats a process procedure of identifying whether the gate type corresponding to the event ID located at an upper level of the parent ID is an OR gate or an AND gate to determine whether the selected event causes the top event.

The safety evaluation system of the present invention makes it possible to determine whether a combination of the event IDs corresponding to the electrical wires belonging to the fault tree information used in FTA causes a top event through searching toward an upper level. When it is determined that the combination of the event IDs does not cause the top event, it is evaluated that the combination of the electrical wires has safety. When it is determined that the combination of the event IDs may cause the top event, it is evaluated that the combination of the electrical wires does not have safety. In any case, according to the present invention, it is possible to easily evaluate wiring safety only by searching the fault tree information.

The safety evaluation system of the present invention may further include a display section configured to perform display relating to a result of the determination performed by the processing section. In the safety evaluation system, when a determination result indicating that a combination of the electrical wires belonging to the fault tree information may cause the top event, the processing section may cause the display section to display the determination result and information that prompts change of a wiring path for the combination of the electrical wires.

In the safety evaluation system of the present invention, when the fault tree information includes identification information indicating that the event ID relates to the electrical wire, the processing section may extract all of the event IDs relating to the electrical wires from the fault tree information, and execute the process procedure for the extracted event IDs.

In the safety evaluation system according to the present invention, the memory section may hold influence evaluation information of a failure mode in which the pins belonging to the connectors of a terminal device are associated with the event IDs. The processing section may extract all of the event IDs relating to the electrical wires from the fault tree information, refer to the influence evaluation information to specify the pin corresponding to each of the extracted event IDs. Then, the processing section may specify a bundle of the wire harness to which the electrical wire directly or indirectly connected to the specified pin belongs, to determine whether the electrical wire and the other electrical wire of the combination belong to one bundle, and execute the process procedure for the wire harness, the bundle, and the connector that are determined as one bundle.

In the safety evaluation system according to the present invention, the memory section may hold electrical wire-connector connection information in which each of the electrical wires is associated with the pair of connectors, connector-connector connection information that is connection information of the connectors fitted to each other, and bundle connection information in which identification information of the bundle that is a bundle of the electrical wires belonging to the wire harness is associated with identification information of relay points or the connectors at both ends of the bundle. In this case, the processing section may refer to the influence evaluation information to specify the pin corresponding to the event ID, and refer to the electrical wire-connector connection information, the connector-connector connection information, and the bundle connection information to determine whether the electrical wire and the other electrical wire of the combination belong to one bundle in the bundle of the wire harness to which the electrical wire directly or indirectly connected to the specified pin belongs.

The influence evaluation information of the failure mode in the present invention may be extracted by performing failure influence evaluation on all of the pins belonging to all of the connectors of the terminal device, for each of failure modes of short-circuit and disconnection of the electrical wire, and may be associated with the event ID relating to the electrical wire.

In addition, the influence evaluation information of the failure mode in the present invention may include information of a failure rate corresponding to the failure mode of at least one of the connector of the terminal device and the electrical wire that is electrically connected to the connector.

According to the present invention, it is possible to easily evaluate wiring safety only through searching of the fault tree information.

BRIEF DESCRIPTION OF THE DRAWINGS

FIG. 5A and FIG. 5B are diagrams illustrating an example of Failure Modes and Effects Analysis (FMEA) of connectors C1 and C2 of a terminal device;

FIG. 6 is a diagram illustrating, in a table format, fault tree information in which an event ID that is identification information of an event, a gate type that is identification information of a gate, and a parent ID are associated with one another;

FIG. 7 is a diagram illustrating, in a table format, connection information in which a wire ID that is identification information of an electrical wire is associated with a connector ID that is identification information of a connector;

FIG. 8 is a diagram illustrating correspondence relationship of pins belonging to connectors fitted to each other, in a table format;

FIG. 9 is a diagram illustrating bundle connection information in which identification information of a bundle is associated with identification information of a pair of connectors;

FIG. 10 is a diagram illustrating an electrical wire list that shows electrical wires belonging to a bundle associated with the bundle; and FIG. 11 is a diagram illustrating a display example of a safety evaluation result.

DETAILED DESCRIPTION OF THE PREFERRED EMBODIMENT

Hereinafter, a wiring safety evaluation system 10 (hereinafter, simply referred to as the evaluation system 10) according to an embodiment of the present invention is described with reference to accompanying drawings.

The evaluation system 10 evaluates safety of electrical wires included in a wiring system in which a plurality of harnesses are connected, with reference to connection information of electrical wires, connectors, and the like and with use of fault tree information. The connection information is design data of the wiring system, and the fault tree information is information of a tool that performs fault tree analysis (FTA). The harness used herein indicates an assembly configured of an electrical connector and a bundle of electrical wires, and the electrical wires are electrically connected to corresponding pins (or corresponding terminals) of the connector.

In this case, the concept of fault tolerance (FT) is applied to the wiring system to be evaluated by the evaluation system 10, and a redundant number necessary for electric wires configuring the harness is set to the wiring system. For example, the redundant number of three or more series that are independent of one another are secured for an electrical wire that causes "catastrophic failure". Likewise, the redundant number of two or more series that are independent of each other are secured for an electrical wire that causes "hazardous failure". This secures an allowable level of occurrence probability. To secure a necessary redundant number of an electrical wire, it is necessary to avoid the electrical wires from belonging to the same segment of the same harness, namely, to avoid one bundle of the electrical wires. Note that the necessary redundant number is set as necessary, and the definition is merely an example.

Figure 1:
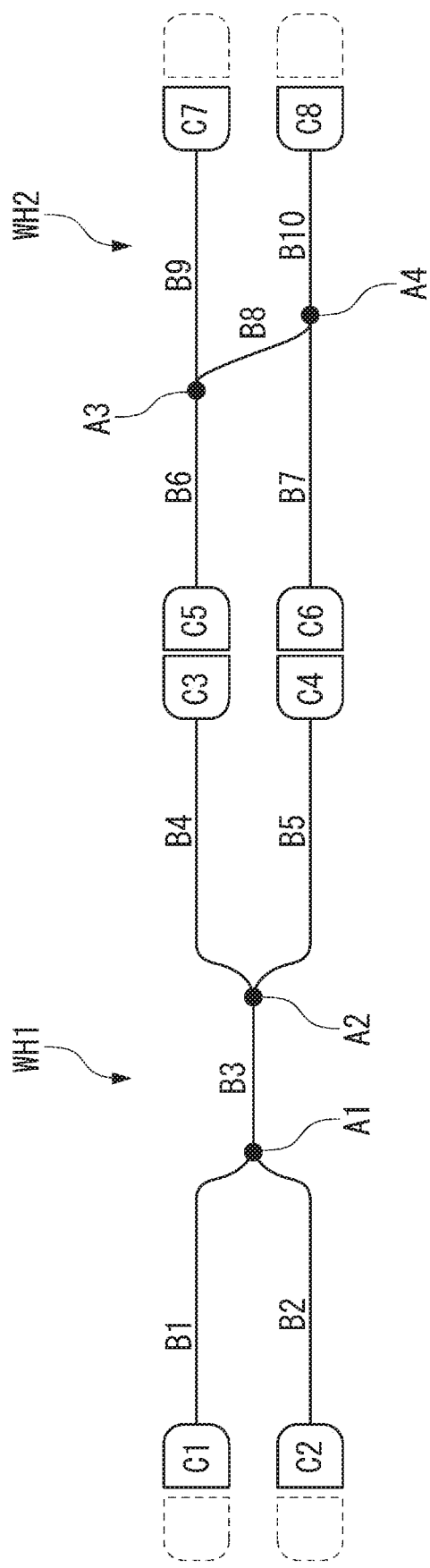
FIG. 1 is a diagram illustrating a configuration of a wire harness evaluated by a wiring safety evaluation system according to an embodiment of the present invention.

FIG. 1 is a diagram illustrating two harnesses WH1 and WH2 configuring a part of the wiring system. The one bundle of the electrical wires is described with use of the harnesses WH1 and WH2.

The harness WH1 in FIG. 1 includes four connectors C1, C2, C3 and C4 that are connected to one another through bundles B1, B2, B3, B4 and B5. The bundles B1, B2 and B3 are connected to one another at a relay point A1, and the bundles B3, B4 and B5 are connected to one another at a relay point A2. Each of the bundles B1 to B5 includes a plurality of electrical wires.

Also, the harness WH2 includes four connectors C5, C6, C7 and C8 that are connected to one another through bundles B6, B7, B8, B9 and B10. The connectors C5 and C6 are respectively connected to the connectors C3 and C4. The bundles B6, B8, and B9 are connected to one another at a relay point A3, and the bundles B7, B8, and B10 are connected to one another at a relay point A4. Note that, in this example, only the connectors are illustrated as terminal parts; however, these connectors C1 to C8 are normally attached to a device such as an input device, a control device, and an output device, or are connected to a relay connector that connects the plurality of harnesses with one another. In addition, the relay points A1 to A4 are identification information of points at which the plurality of bundles are branched and merged.

In the harness WH1, the connector C1 is connected to the connector C2 through the bundles B1 and B2. The bundles B1 and B2 are connected to the relay point A1, which causes the relay point A1 to become a passing point of the bundle B1 and the bundle B2 or a connection point between the bundle B1 and the bundle B2.

Likewise, the relay point A1 is connected to the relay point A2 through the bundle B3, and one end of the bundle B3 is connected to the relay point A1 and the other end thereof is connected to the relay point A2.

The same applies to each of the connectors C3, C4, C5, C6, C7 and C8.

Each of the bundles B1 to B10 includes a plurality of electrical wires, and the electrical wires are connected to corresponding pins of the connectors C1 to C8. Note that illustration of the pins is omitted in FIG. 1. For example, all of electrical wires connected to the connector C1 pass through the bundle B1, some of the electrical wires are connected to the connector C2 through the bundle B2, and the others reach the relay point A2 through the bundle B3. All of electrical wires connected to the connector C2 pass through the bundle B2, some of the electrical wires are connected to the connector C1 through the bundle B1, and the others reach the relay point A2 through the bundle B3. Likewise, all of electrical wires connected to the connector C3 pass through the bundle B4, some of the electrical wires are connected to the connector C4 through the bundle B5, and the others reach the relay point A1 through the bundle B3. All of electrical wires connected to the connector C4 pass through the bundle B5, some of the electrical wires are connected to the connector C3 through the bundle B4, and the others reach the relay point A1 through the bundle B3. The same applies to each of the connectors C5 to C8.

In the harness WH1, for example, the electrical wires belonging to the bundle B1 (not illustrated in FIG. 1) belong to the bundle B3 except for electrical wires connected to the connector C2 through the bundle B2. The electrical wires belonging to the bundle B2 belong to the bundle B3 except for electrical wires connected to the connector C1 through the bundle B1. The electrical wires belonging to the bundle B3 belong to one bundle but it is necessary to avoid the plurality of electrical wires requiring redundancy from belonging to one bundle in the bundle B3.

Next, as for the connectors C5 to C8, the electrical wires belonging to the bundle B6 belong to one of the bundles B8 and B9 after passing through the relay point A3. The electrical wires belonging to the bundle B7 belong to one of the bundles B8 and B10 after passing through the relay point A4. The electrical wires belonging to the bundle B8 configure one bundle, and it is necessary to avoid the plurality of electrical wires requiring redundancy from belonging to one bundle in the bundle B8. The electrical wires belonging to each of the bundles are illustrated in an electrical wire list in FIG. 10.

Qualitative evaluation with respect to a risk of simultaneous failure is performed by the evaluation system 10 with use of fault tree information based on whether the designed wiring system secures necessary redundancy. In the example of the harnesses WH1 and WH2 in FIG. 1, the evaluation system 10 performs qualitative evaluation of safety in which a plurality of electrical wires that are not allowed to simultaneously fail do not belong to one bundle.

The evaluation system 10 performs the evaluation by performing the following first to third steps in order.

First Step: extracting identification information (an event ID) relating to an electrical wire from the fault tree information.

Second Step: referring to connection information of electric wires and connectors to extract electrical wires that belong to one bundle by a combination of two or more event IDs, from the electrical wires relating to all of the event IDs extracted in the first step.

Third Step: referring to the fault tree information to evaluate concurrent fault risk of the combination of event IDs extracted in the second step.

Hereinafter, the schematic configuration of the evaluation system 10 is described, and then specific contents of the first to third steps are described.

[Outline of Evaluation System 10]

Figure 2:
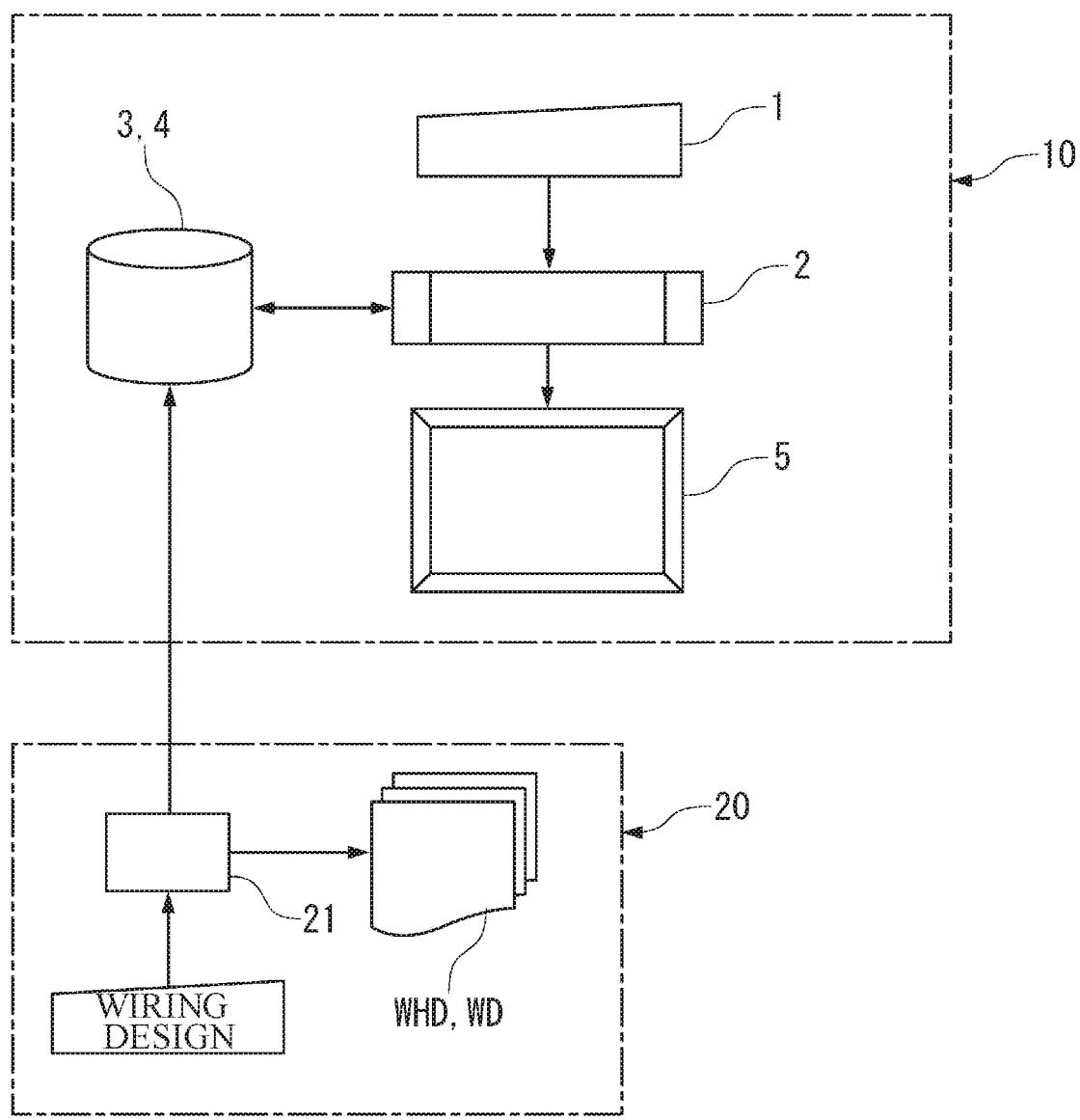
FIG. 2 is a diagram illustrating a schematic configuration of the evaluation system according to the present embodiment.

As illustrated in FIG. 2, the evaluation system 10 includes an input section 1, a processing section 2, a first memory section 3, a second memory section 4, and a display section 5. The evaluation system 10 may be configured of a personal computer or other computer apparatus.

The evaluation system 10 is connected to a wiring drawing system 20. The wiring drawing system 20 is also configured of a computer apparatus.

The input section 1 is a section through which instruction necessary to execute the evaluation system 10 is inputted. The input section 1 may be configured of a keyboard serving as an input device of the computer.

The processing section 2 reads fault tree information and other connection information stored in the first memory section 3, and executes a procedure described later, thereby storing a result of the procedure in the second memory section 4 or causing the display section 5 to display the result of the procedure.

The display section 5 displays the result of the procedure processed by the processing section 2. The display section 5 may be configured of a liquid crystal display device serving as a display device of the computer.

[Outline of Wiring Drawing System 20]

The wiring drawing system 20 includes a computer aided design (CAD) 21. The CAD 21 acquires connection information relating to connectors, cables, and devices that are used in a wiring design process, thereby creating a wiring diagram (hereinafter, also simply referred to as WD). The WD illustrates connection relationship between the electrical wires and the connectors that belong to the harnesses WH1 and WH2, and the like. In the connection information based on the WD, identification information of a harness (a harness ID), identification information of an electrical wire (a wire ID), identification information of a connector and a pin (a connector ID and a pin ID) are associated with one another. The CAD 21 provides the acquired connection information to the first memory section 3 of the evaluation system 10. The first memory section 3 holds the connection information provided from the CAD 21.

[Fault Tree Information]

Figure 3:
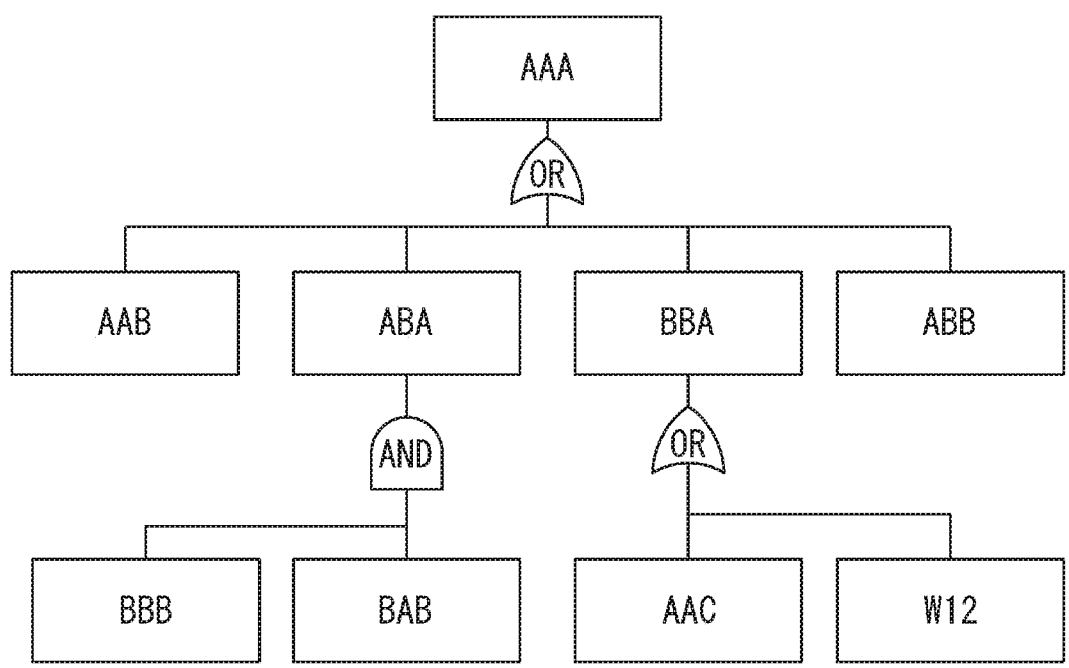
FIG. 3 is a diagram illustrating a fault tree.
Figure 4:
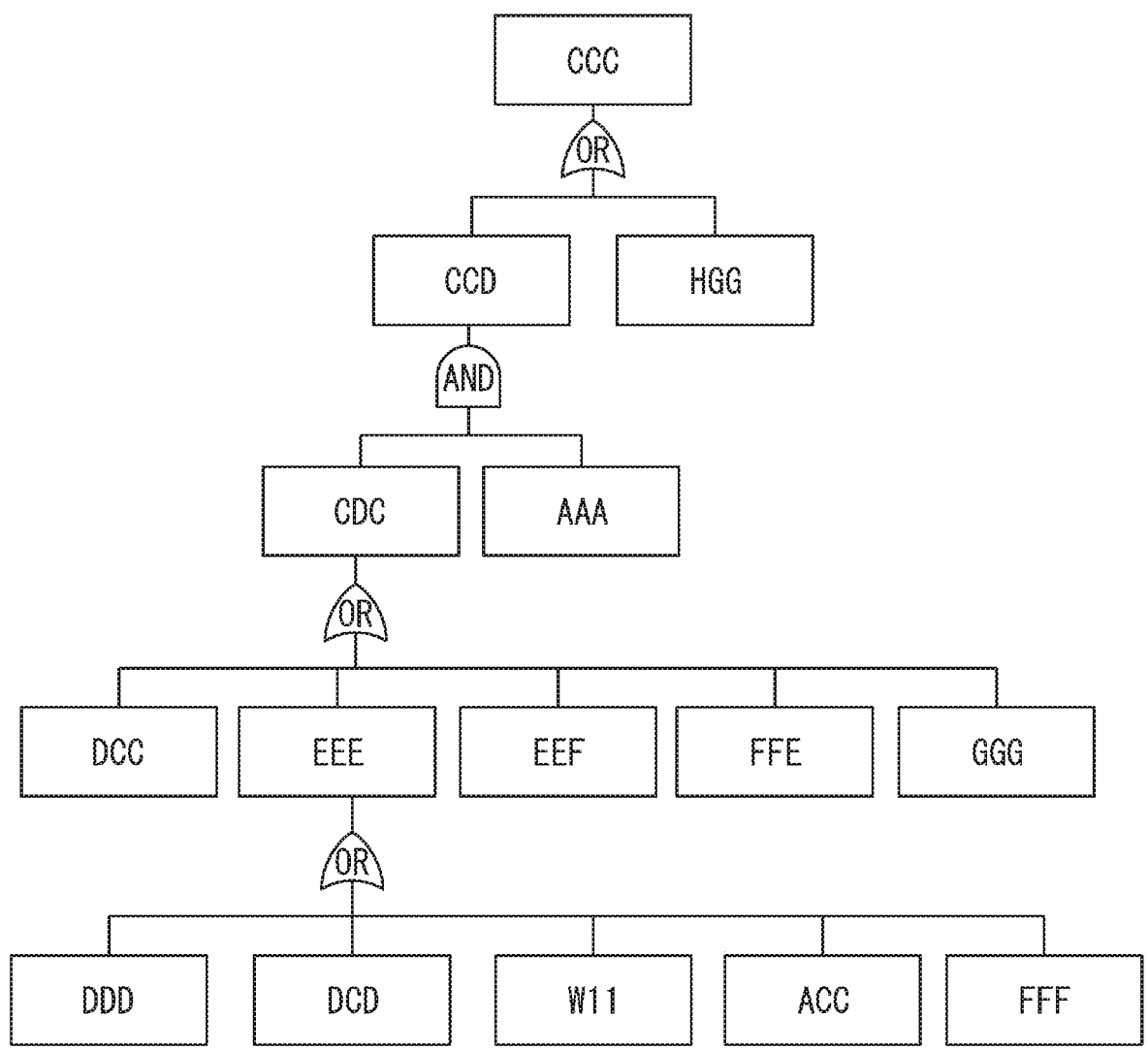
FIG. 4 is a diagram illustrating another example of the fault tree.

FIG. 3 and FIG. 4 illustrate an example of a fault tree (FT). Note that FIG. 3 and FIG. 4 illustrate only a part of failure events in the system including the wiring, and an actual system is configured of several tens or several hundreds of fault trees. In addition, the fault tree may be created by a well-known FTA software (an FTA tool).

In FIG. 3, an undesirable event (AAA) is disposed on the uppermost stage of the figure. The event is referred to as a top event, and the top event is normally limited to an event, occurrence of which is preventable, and it is not possible to handle a natural phenomenon as a top event. Causal events (sufficient conditions) involved in occurrence of the top event are systematically listed under the top event. The causal events are classified into middle events and basic events, and the basic events are arranged in the lowermost stage of the series.

In the fault tree of FIG. 3, a logic symbol indicating relationship that, in the case where lower events AAB, ABA, BBA, and ABB are placed under the top event AAA, when one of the lower events AAB, ABA, BBA, and ABB occurs, the top event AAA occurs, is referred to as an OR gate. Also, in the fault tree of FIG. 3, a logic symbol indicating relationship that the upper event ABA occurs only when both of lower events BBB and BAB occur at a time, is referred to as an AND gate. The fault tree of FIG. 4 is also created under similar regulations. For example, the top event AAA of FIG. 3 may be listed up as one of middle events involved in occurrence of a top event CCC in the fault tree of FIG. 4).

The events illustrated in the fault tree including FIG. 3 and FIG. 4 are not limited to events relating to electrical wires, and include events relating to a system, a function, a device, a component, and the like that relate to an object top event. In this case, however, events are illustrated with use of symbols such as AAA in order to facilitate understanding. Events relating to electrical wires, however, are denoted by W11 and W12 to be clearly distinguished from other events. Also, the events relating to the electrical wires may be extracted through execution of failure modes relating the electrical wires, for example, Failure Modes and Effects Analysis (FMEA) that evaluates influence of a failure mode relating to electrical wires, such as short-circuit failure and disconnection failure. Executing the FMEA on the connectors belonging to a terminal device makes it possible to efficiently extract the events without overlapping and omission.

FIGS. 5A and 5B are diagrams illustrating influence evaluation information of a failure mode of the connectors C1 and C2 belonging to the terminal device, obtained through FMEA. The influence evaluation information of the FMEA illustrated in FIG. 5A indicates that the event W11 in the fault tree of FIG. 4 is caused by a short-circuit failure or a disconnection failure of an electrical wire or a connector connected to, for example, a pin P13 of the connector C1. Likewise, the influence evaluation information of the FMEA illustrated in FIG. 5B indicates that the event W12 in the fault tree of FIG. 3 is caused by a short-circuit failure of an electrical wire connected to, for example, a pin P23 of the connector C2. As mentioned above, a plurality of pins belonging to the connector and event IDs are associated with one another in the influence evaluation information which is stored in the first memory section 3. Note that information of a failure rate is not illustrated in FIG. 5A or FIG. 5B; however, if all of failure rates of at least one of the connector belonging to the terminal device and the electrical wires electrically connected to the connector are calculated, and the calculated failure rate are set as the failure rates of the respective events and are stored in the first memory section 3, it is obviously possible to quantitatively analyze and evaluate the occurrence probability of the top event, with use of the above-described FTA tool.

In the present embodiment, an event relating to an electrical wire that is located at lower level of the top event is selected, and determination whether the selected event reaches the top event depending on the kind of the gate is performed. In the present embodiment, the event denoted by W11 in FIG. 4 and the event denoted by W12 in FIG. 3 are events to be finally determined. The events to be determined are extracted through the first step and the second step.

When the event W12 relating to the electrical wire occurs in the fault tree of FIG. 3, the top event AAA occurs. In contrast, it is clear that when the event W11 relating to the electrical wire occurs in the fault tree of FIG. 4, a middle event CDC occurs. In this example, a logic symbol at which an upper event CCD of the middle event CDC occurs in FIG. 4 is the AND gate. Therefore, it is understood that when the events W11 and W12 occurs at a time, an event CCC that is a top event occurs. Note that a structure in which a top event (AAA) of one tree becomes a middle event of the other tree, as illustrated in FIG. 3 and FIG. 4 is referred to as a nest structure.

FIG. 6 is a diagram illustrating the fault tree information used in the first step and the third step. The fault tree information is previously stored in the first memory section 3.

The fault tree information is information of a table format in which identification information for each event (an event ID), identification information relating to a gate (a gate type) between an event and an upper event thereof, and identification information of an upper event (a parent ID) are associated with one another. Note that the fault tree information also includes information other than the event ID, the gate type, and the parent ID; however, only information necessary for determination of the present embodiment are described.

In FIG. 6, respective pieces of information having event IDs AAA to W12 correspond to the fault tree of FIG. 3, and respective pieces of information having event IDs CCC to AAA correspond to the fault tree of FIG. 4. The event CCC corresponding to the top event does not have an upper event. Therefore, the parent ID of the event CCC is a blank. The blank becomes identification information indicating that the event ID of the blank corresponds to the top event; however, the identification information may be actively provided therefor.

Although the detail is described later, an event relating to an electrical wire is selected from the fault tree information, determination whether the selected event reaches an event located at an upper level thereof depending on a gate type is performed sequentially to confirm and evaluate whether the selected event causes the top event. It is searched and specified that the harness, the bundle, and the connector that belong to one bundle selected in the second step correspond to events (W11 and W12). When it is confirmed that the top event is caused by a combination of events (W11 and W12) both relating to the electrical wires or a combination of an event relating to an electrical wire (at least one of the events W11 and W12) and an event other than the event relating to an electrical wire, it is necessary to change a wiring path of the electrical wires.

[Connection Information]

FIG. 7 is a diagram illustrating an example of connection information stored in the first memory section 3.

The connection information indicates electrical wire-connector connection information that associates connection relationship between identification information of electrical wires (wire IDs) that belong to the harnesses WH1 and WH2 illustrated in FIG. 1 respectively and identification information of connectors (connector IDs).

It is shown that, in the case of the harness WH1, electrical wires having respective wire IDs W101 and W102 are connected to the connector C1 and the connector C2, electrical wires having respective wire IDs W103 and W104 are connected to the connector C1 and the connector C3, and electrical wires having respective wire IDs W105 and W106 are connected to the connector C1 and the connector C4. Among them, the electrical wires having the wire IDs W101 and W102 are respectively connected to pins having pin IDs P11 and P12 of the connector C1, and are respectively connected to pins P21 and P22 of the connector C2. The same applies to other electrical wires and the harness WH2.

Note that only a part of harnesses in the wiring system is illustrated; however, the actual wiring system has electrical wire-connector connection information relating to a lot of harnesses.

Next, FIG. 8 is a diagram illustrating connector-connector connection information that is connection information between connectors fitted to each other in the harnesses WH1 and WH2. The connector-connector connection information is stored in the first memory section 3.

As illustrated in FIG. 1, in the harnesses WH1 and WH2, the connector C3 and the connector C5 are fitted to each other, and the connector C4 and the connector C6 are fitted to each other. The connector-connector connection information indicates relationship of fitting including the connection relationship of pins.

As for the connector C3 and the connector C5, it is shown that the connector C3 includes six pins that are specified by pin IDs P31 to P36, and the connector C5 includes six pins that are specified by pin IDs P51 to P56. Further, connection relationship of the pins P51 to P56 of the connector C5 that are respectively fitted to the corresponding pins P31 to P36 of the connector C3 is also illustrated.

The same applies to the connector C4 and the connector C6, and FIG. 8 illustrates that, for example, the pin P31 of the connector C3 is fitted to the pin P55 of the connector C5, and the pin P41 of the connector C4 is fitted to the pin P61 of the connector C6.

In this example, it is possible to search a wiring path of a specific electrical wire by referring to the electrical wire-connector connection information illustrated in FIG. 7 and the connector-connector connection information illustrated in FIG. 8. For example, the electrical wire W103 is connected to the pin P13 of the connector C1 and the pin P31 of the connector C3 in FIG. 7, the pin P31 of the connector C3 is connected to the pin P55 of the connector C5 in FIG. 8, and an electrical wire W205 is connected between the pin P55 of the connector C5 and the pin P81 of the connector C8 in FIG. 7.

Also, an electrical wire W107 is connected to the pin P23 of the connector C2 and the pin P33 of the connector C3 in FIG. 7, the pin P33 of the connector C3 is connected to the pin P53 of the connector C5 in FIG. 8, and an electrical wire W203 is connected between the connector P53 of the connector C5 and the pin P71 of the connector C7 in FIG. 7. Referring to the electrical wire-connector connection information and the connector-connector connection information in this way makes it possible to search the wiring path through which the electrical wire belonging to the plurality of harnesses passes.

Next, FIG. 9 is a diagram illustrating bundle connection information relating to the harnesses WH1 and WH2. The bundle connection information is stored in the first memory section 3.

The bundle connection information is information in which identification information of a bundle (a bundle ID) that is a bundle of electrical wires belonging to the harnesses WH1 and WH2 is associated with identification information of connectors or relay points at both ends of the bundle (ITEM-1 and ITEM-2). For example, FIG. 9 shows that a bundle B1 is disposed between the connector C1 and the relay point A1.

The bundle connection information is used to specify electrical wires that belong to each bundle through reference of the electrical wire-connector connection information. Here, in the example of the connector C1 and the connector C2 of FIG. 7, the connector C1 and the connector C2 are connected by the electrical wires W101 and W102, whereas the bundle B1 and a bundle B2 are interposed between the connector C1 and the connector C2 through the relay point A1 as illustrated in FIG. 9. This makes it possible to specify that both the electrical wires W101 and W102 belong to the bundle B1 and the bundle B2.

FIG. 10 is a diagram illustrating an electrical wire list thus generated, in which the bundles and the electrical wires belonging to the respective bundles are associated with one another. For example, since the electrical wires W101 to W106 belonging to the bundle B1 belong to one bundle, these electrical wires are objects of safety evaluation.

[Evaluation Procedure]

Hereinafter, the procedure of a safety evaluation method of a wiring system with use of the evaluation system 10 is described in order of the first step, the second step, and the third step.

[First Step]

In the present embodiment, the series of procedures of the evaluation method start with extraction of an event ID relating to an electrical wire from the fault tree information (FIG. 6). For example, in the procedure, a process is started when a keyword "W" indicating an electrical wire is inputted from the input section 1 to the event ID of the fault tree information. The inputted keyword is transmitted to the processing section 2. Then, the processing section 2 reads out the fault tree information from the first memory section 3, and refers to the read fault tree information, thereby extracting all event IDs (W_) relating to the electrical wires.

Note that the following second step and third step are also executed when the processing section 2 refers to the electrical wire-connector connection information and the like stored in the first memory section 3.

[Second Step]

In the second step, pins corresponding to all of the event IDs relating to electrical wires that are extracted in the first step are specified by referring to the influence evaluation information of the failure mode. Then, in the second step, event IDs (wire IDs) belonging to one bundle are extracted by referring to the electrical wire-connector connection information (FIG. 7), the connector-connector connection information (FIG. 8), and the bundle connection information (FIG. 9), or the like. As a result, the evaluation objects in the following third step are narrow down to electrical wires belonging to one bundle that are extracted in the second step.

When acquiring all of the event IDs relating to electrical wires that are extracted in the first step, the processing section 2 reads out the influence evaluation information of the failure mode (FIGS. 5A and 5B) from the first memory section 3, and refers to the influence evaluation information for each of the acquired event IDs, thereby specifying a connector ID and a pin ID corresponding to the event ID. For example, when the acquired event ID is W11, the processing section 2 refers to FIG. 5A to specify the connector C1 and the pin P13.

The processing section 2 then reads out the electrical wire-connector connection information (FIG. 7) from the first memory section 3, and refers to the read electrical wire-connector connection information and the event ID.

Thereafter, the processing section 2 specifies the wire ID corresponding to each of the acquired event IDs, and further specifies the connector ID of the connector to which the electrical wire of the specified wire ID is connected. For example, the connector and the pin that relate to the event ID W11 extracted in the first step are respectively the connector C1 and the pin P13 as illustrated in FIG. 5A. Therefore, it is specified from the electrical wire-connector connection information (FIG. 7) that the electrical wire, the connector, and the pin directly connected to the connector C1 and the pin P13 are respectively the electrical wire W103, the connector C3, and the pin P31, and it is specified from the connector-connector connection information (FIG. 8) that the pin P55 of the connector C5 is connected to the pin P31. Further, it is specified from the electrical wire-connector connection information (FIG. 7) that the electrical wire, the connector, and the pin connected to the pin P55 are respectively the electrical wire W205, the connector C8, and the pin P81. The electrical wire W205, the connector C8, and the pin P81 are indirectly connected to the pin P13.

The specification processing is performed on all of the acquired event IDs. For example, when the connector and the pin relating to the event W12 are the connector C2 and the pin P23 as illustrated in FIG. 5B, it is specified from the electrical wire-connector connection information and the connector-connector connection information that the electrical wire, the connector, and the pin to be connected are the electrical wire W107, the connector C3, the pin P33, the connector C5, the pin P53, the electrical wire W203, the connector C7, and the pin P71, as with the event W11.

Thereafter, the processing section 2 reads out the bundle connection information (FIG. 9) from the first memory section 3, and crosschecks the read bundle connection information with the acquired connector ID, thereby specifying the bundle ID of the bundle to which the electrical wire connected to the acquired connector ID belongs. For example, when the acquired connector IDs are the connector C1 and the connector C3, it is found from FIG. 9 that the bundle B1, the bundle B3, and the bundle B4 are disposed between the connector C1 and the connector C3 through the relay points A1 and A2. Therefore, it is specified that the electrical wire W103 belongs to three bundles of the bundle B1, the bundle B3, and the bundle B4.

Performing the processing of specifying the bundle on all of the acquired connector IDs allows for specification of the wire IDs belonging to each of the bundles B1 to B10. The processing section 2 associates the specified wire ID with the bundle ID to generate the electrical wire list illustrated in FIG. 10, and then stores the electrical wire list in the first memory section 3.

The processing section 2 refers to the electrical wire list of FIG. 10 to determine whether the specific electrical wire and the other electrical wire belong to one bundle. For example, paying attention to the electrical wire W103 directly connected to the pin P13 specified for the event W11 and the electrical wire W107 directly connected to the pin P23 specified for the event W12 mentioned above, the electrical wire 103 belongs to the bundles B1, B3, and B4, whereas the electrical wire W107 belongs to the bundles B2, B3, and B4. Therefore, it is determined that the electrical wire W103 and the electrical wire W107 belong to one bundle in each of the bundles B3 and B4.

Also, paying attention to the electrical wire W205 indirectly connected to the pin P13 specified for the event W11 and the electrical wire W203 indirectly connected to the pin P23 specified for the event W12 mentioned above, the electrical wire W205 belongs to the bundles B6, B8, and B10, whereas the electrical wire W203 belongs to the bundles B6 and B9. Therefore, it is determined that the electrical wire W205 and the electrical wire W203 belong to one bundle in the bundle B6.

[Third Step]

In the third step, wiring safety of the plurality of electrical wires that are determined as one bundle in the second step is qualitatively analyzed with use of the output information of the FTA tool. The analysis procedure is described with reference to FIG. 3, FIG. 4, FIG. 6, and FIG. 10.

First, the analysis procedure of wiring safety is described.

In this case, an example of searching only the event W11 is described.

As illustrated in FIG. 4 and FIG. 6, the parent ID of the event W11 is an event EEE, and the event W11 is connected to the event EEE through an OR gate. Therefore, occurrence of the event W11 causes the event EEE.

As a result, searching is then performed for the event EEE. The parent ID of the event EEE is an event CDC, and the event EEE is connected to the event CDC through an OR gate. Therefore, occurrence of the event EEE causes the event CDC.

Accordingly, searching is then performed for the event CDC. The parent ID of the event CDC is an event CCD, and the event CDC is connected to the event CCD through an AND gate. Therefore, even when the event CDC occurs, the event CCD is not caused only by the event CDC.

As mentioned above, a result of the analysis of searching only the event W11 does not reach the event CCC that is the top event. Therefore, it is determined that safety of the event W11 is secured.

In the above-described example of the event W11, if the event CDC is connected to the parent event CCD through an OR gate, occurrence of the event CDC causes the event CCD. In this case, the parent ID of the event CCD is the event CCC that is the top event, and the event CDC is connected to the event CCC through an OR gate. Therefore, occurrence of the event CDC failure causes the top event. Since the top event occurs due to the single failure of the event W11 in this case, it is determined that safety is not secured.

Next, an example of searching a combination of the event W12 relating to the fault tree of FIG. 3 and the event W11 relating to the fault tree of FIG. 4 is described.

When the event W12 relating to an electrical wire occurs in the fault tree of FIG. 3, the top event AAA occurs. On the other hand, when the event W11 relating to an electrical wire occurs in the fault tree of FIG. 4, the middle event CDC occurs. Since a logic symbol at which the upper event CCD of the middle event CDC occurs is an AND gate, it is found that the top event (CCC) occurs when a combination of the event W11 and the event W12 occurs at a time. Therefore, when the electrical wire relating to the event W11 and the electrical wire relating to the event W12 belong to one bundle in the bundle or the connector, the top event is caused by a single failure of the bundle or the connector. Thus, it is determined that safety is not secured.

The processing section 2 performs analysis of safety for all of electrical wires that belong to one bundle in the electrical wire list of FIG. 10, through the above-described procedures. The processing section 2 causes the display section 5 to display the analysis results of all of the electrical wires. The display format is optional. For example, as illustrated in FIG. 11, the processing section 2 causes the display section 5 to display, for each harness ID, the wire ID, safety of which has been verified and the wire ID, safety of which has not been verified, and the latter is displayed together with a display prompting change of the design.

The safety analysis procedure and an example of the display result of FIG. 11 are described below.

In the harness WH1, the electrical wire relating to the event W11 and the electrical wire relating to the event W12 are respectively the electrical wire W103 and the electrical wire W107, as described in the second step. Thus, with referring to the electrical wire list of FIG. 10, the bundles B3 and B4 each include both the electrical wire W103 and the electrical wire W107, and the connector C3 is directly connected to these bundles (refer to ITEM-1 and ITEM-2 in FIG. 10). Therefore, the display example of an upper part of FIG. 11 shows that safety for the bundle B3, the bundle B4, and the connector C3 has been denied. The display for the other bundles B1, B2, and B5 and the connectors C1, C2, and C4 that are directly connected to these bundles shows that safety therefor has been verified.

Also, in the harness WH2, the electrical wire relating to the event W11 and the electrical wire relating to the event W12 are respectively the electrical wire W203 and the electrical wire W205, as described in the second step. Therefore, with referring to the electrical wire list of FIG. 10, the bundle B6 includes both the electrical wire W203 and the electrical wire W205, and the connector C5 is directly connected to the bundle B6. Therefore, the display example of a lower part of FIG. 11 shows that safety for the bundle B6 and the connector C5 has been denied, and the display for the other bundles B7, B8, B9, and B10 and the connectors C6, C7, and C9 that are directly connected to these bundles shows that safety therefor has been verified.

As mentioned above, the safety evaluation system 10 according to the present embodiment makes it possible to easily determine whether the event ID relating to the electrical wire has safety by searching the event ID, the gate type, and the parent ID in the fault tree information. In addition, since the fault tree information is given as a premise for design of the wiring system, the safety evaluation system 10 makes it possible to easily determine safety of electrical wires without constructing special information.

The fault tree information includes event information other than the electrical wires, but the safety evaluation system 10 narrows down the event IDs relating to the electrical wires with use of the fault tree information in the first step. Further, the safety evaluation system 10 extracts electrical wires belonging to one bundle and narrows down the evaluation objects in the second step. Therefore, according to the present embodiment, it is possible to efficiently determine safety of electrical wires.

Although the preferred embodiment of the present invention has been described hereinbefore, the components described in the above-described embodiment may be selected or may be appropriately replaced with other components without departing from the scope of the present invention.

For example, in the present embodiment, the third step is executed after the first step and the second step; however, when the electrical wires to be evaluated are narrowed down by other methods or when the number of the electrical wires to be evaluated is not large, it may be possible to execute the third step without performing the first step and the second step.

Also, the wiring example used in the description of the present embodiment is a merely example. The present invention is applicable to other wiring examples, the devices and the apparatuses applied to the present invention are not limited, and the present invention is applicable to various devices and apparatuses in which the terminal device and the relay device are connected through electrical wires.

For example, the safety evaluation system 10 is suitably used to evaluate safety of a wiring structure including a lot of wire harnesses that is mounted on an aircraft.

What is claimed is:

1. A wiring safety evaluation system in a wiring structure in which a plurality of electrical wires belonging to a wire harness are each connected, through relay elements, to a pair of connectors located at respective ends of the wire harness, the safety evaluation system comprising:
    memory configured to hold fault tree information, the fault tree information associating event IDs serving as identification information of respective events relating to an electrical wire of the plurality of electrical wires, gate types indicating respective types of gates corresponding to the respective event IDs, parent IDs serving as identification information of parent events within a fault tree above a level of the events of each of the event IDs, and identification information indicating whether a parent ID; and
    a processor that, by referring to the fault tree information, is configured to execute an extracting step of extracting event IDs relating to one of the electrical wires and execute an evaluation of the extracted event IDs, the evaluation including:
    a first step of identifying whether a type of gate between one of the extracted event IDs and a first parent ID at an immediate upper level to the one of the extracted event IDs is an OR gate or an AND gate, and
    a second step of identifying, when the gate type is identified as the OR gate, whether a type of gate between the first parent ID and a second parent ID at an immediate upper level to the first parent ID is an OR gate or an AND gate,
    wherein, the second step is repeated for parent IDs at successively immediate upper levels, and
    wherein when the gate type identified by the second step is the AND gate, the one of the extracted event IDs is determined not to be the only cause of the top event.

2. The wiring safety evaluation system according to claim 1, further comprising a display configured to display a result of the determination performed by the processor,
    wherein when the evaluation indicates that a combination of the electrical wires belonging to the fault tree information causes the top event, the processor is configured to cause the display to display a result of the evaluation and information that prompts changing of a wiring path for the combination of the electrical wires.

3. The wiring safety evaluation system according to claim 1, wherein:
    the memory is further configured to hold influence evaluation information of a failure mode in which pins belonging to connectors of a terminal device are associated with the respective event IDs, and
    the processor is further configured to:
    extract event IDs relating to the electrical wires from the fault tree information,
    refer to the influence evaluation information to specify the pin corresponding to each of the extracted event IDs,
    specify a bundle of the wire harness to which the electrical wire directly or indirectly connected to the specified pin belongs,
    determine whether the electrical wire and the other electrical wire of the combination belong to one bundle, and execute the first and second evaluation steps for the wire harness, the bundle, and the connector that are determined as one bundle.

4. The wiring safety evaluation system according to claim 3, wherein:
the memory is further configured to hold electrical wire-connector connection information in which each of the electrical wires is associated with the pair of connectors, connector-connector connection information that is connection information of the connectors fitted to each other, and bundle connection information in which identification information of the bundle that is a bundle of the electrical wires belonging to the wire harness is associated with identification information of relay points or the connectors at both ends of the bundle, and
the processor is further configured to:
refer to the influence evaluation information to specify the pin corresponding to the event ID, and
refer to the electrical wire-connector connection information, the connector-connector connection information, and the bundle connection information to determine whether the electrical wire and the other electrical wire of the combination belong to one bundle in the bundle of the wire harness to which the electrical wire directly or indirectly connected to the specified pin belongs.

5. The wiring safety evaluation system according to claim 4, wherein
the influence evaluation information of the failure mode is extracted by performing failure influence evaluation on pins belonging to connectors of the terminal device, for each of failure modes of short-circuit and disconnection of the electrical wire, and
the influence evaluation information is associated with the event ID relating to the electrical wire.

6. The wiring safety evaluation system according to claim 4, wherein the influence evaluation information of the failure mode includes information of a failure rate corresponding to the failure mode of at least one of the connector of the terminal device and the electrical wire that is electrically connected to the connector.

7. The wiring safety evaluation system according to claim 3, wherein:
the influence evaluation information of the failure mode is extracted by performing failure influence evaluation on pins belonging to connectors of the terminal device, for each of failure modes of short-circuit and disconnection of the electrical wire, and
the influence evaluation information is associated with the event ID relating to the electrical wire.

8. The wiring safety evaluation system according to claim 7, wherein the influence evaluation information of the failure mode includes information of a failure rate corresponding to the failure mode of at least one of the connector of the terminal device and the electrical wire that is electrically connected to the connector.

9. The wiring safety evaluation system according to claim 3, wherein the influence evaluation information of the failure mode includes information of a failure rate corresponding to the failure mode of at least one of the connector of the terminal device and the electrical wire that is electrically connected to the connector.

10. A wiring safety evaluation method of evaluating safety of a plurality of electrical wires in a wiring structure in which the electrical wires belonging to a wire harness are each connected, through relay elements, to a pair of connectors located at respective ends, by causing a processor to refer to information stored in memory, the method comprising:
holding in the memory fault tree information, the fault tree information associating event IDs serving as identification information of respective events relating to an electrical wire of the plurality of electrical wires, gate types indicating respective types of gates corresponding to the respective event IDs, parent IDs serving as identification information of parent events within a fault tree above a level of the events of each of the event IDs, and identification information indicating whether a parent ID is a top event; and
with the processor, by referring to the fault tree information, extracting all of the event IDs relating to one of the electrical wires and executing an evaluation of the extracted event IDs, the evaluation including:
a first step of identifying whether a type of gate between one of the extracted event IDs and a first parent ID at an immediate upper level to the one of the extracted event IDs is an OR gate or an AND gate, and
a second step of identifying, when the gate type is the OR gate, whether a type of gate between the first parent ID and a second parent ID at an immediate upper level to the first parent ID is an OR gate or an AND gate,
wherein, the second step is repeated for parent IDs at successively immediate upper levels, and
wherein when the gate type identified by the second step is the AND gate, the one of the extracted event IDs is determined not to be the only cause of the top event.

11. The wiring safety evaluation method according to claim 10, further comprising displaying a display relating to a result of the determination performed by the processor,
wherein when the evaluation indicates that a combination of the electrical wires belonging to the fault tree information causes the top event, the display a result of the evaluation and information that prompts change of a wiring path for the combination of the electrical wires.

12. The wiring safety evaluation method according to claim 10, further comprising:
holding in the memory influence evaluation information of a failure mode in which pins belonging to connectors of a terminal device are associated with the respective event IDs, and
with the processor:
extracting event IDs relating to the electrical wires from the fault tree information,
referring to the influence evaluation information to specify the pin corresponding to each of the extracted event IDs,
specifying a bundle of the wire harness to which the electrical wire directly or indirectly connected to the specified pin belongs,
determining whether the electrical wire and the other electrical wire of the combination belong to one bundle, and
executing the first and second evaluation steps for the wire harness, the bundle, and the connector that are determined as one bundle.

13. The wiring safety evaluation method according to claim 12, further comprising:
holding in the memory electrical wire-connector connection information in which each of the electrical wires is associated with the pair of connectors, connector-connector connection information that is connection information of the connectors fitted to each other, and bundle connection information in which identification information of the bundle that is a bundle of the electrical wires belonging to the wire harness is associated with identification information of relay points or the connectors at both ends of the bundle, and with the processor:
referring to the influence evaluation information to specify the pin corresponding to the extracted event ID, and referring to the electrical wire-connector connection information, the connector-connector connection information, and the bundle connection information to determine whether the electrical wire and the other electrical wire of the combination belong to one bundle in the bundle of the wire harness to which the electrical wire directly or indirectly connected to the specified pin belongs.

14. The wiring safety evaluation method according to claim 13, wherein:

the influence evaluation information of the failure mode is extracted by performing failure influence evaluation on pins belonging to connectors of the terminal device, for each of failure modes of short-circuit and disconnection of the electrical wire, and the influence evaluation information is associated with the event ID relating to the electrical wire.

15. The wiring safety evaluation method according to claim 13, wherein the influence evaluation information of the failure mode includes information of a failure rate corresponding to the failure mode of at least one of the connector of the terminal device and the electrical wire that is electrically connected to the connector.

16. The wiring safety evaluation method according to claim 12, wherein:

the influence evaluation information of the failure mode is extracted by performing failure influence evaluation on pins belonging to connectors of the terminal device, for each of failure modes of short-circuit and disconnection of the electrical wire, and the influence evaluation information is associated with the event ID relating to the electrical wire.

17. The wiring safety evaluation method according to claim 12, wherein the influence evaluation information of the failure mode includes information of a failure rate corresponding to the failure mode of at least one of the connector of the terminal device and the electrical wire that is electrically connected to the connector.

* * * * *

UNITED STATES PATENT AND TRADEMARK OFFICE
CERTIFICATE OF CORRECTION

PATENT NO. : 10,591,529 B2
APPLICATION NO. : 15/384649
DATED : March 17, 2020
INVENTOR(S) : Koji Toyama and Susumu Hirabayashi It is certified that error appears in the above-identified patent and that said Letters Patent is hereby corrected as shown below:

In the Claims

Claim 1, Column 14, Line 21, "parent ID; and", should be -- parent ID is a top event; and --

Claim 10, Column 16, Line 15, "extracting all of the event", should be -- extracting event --

Signed and Sealed this
Twentieth Day of July, 2021

Drew Hirshfeld
*Performing the Functions and Duties of the
Under Secretary of Commerce for Intellectual Property and
Director of the United States Patent and Trademark Office*